Oct. 4, 1938. H. E. DAVIS 2,131,727
CONFECTION HANDLE AND METHOD OF MAKING SAME
Filed Dec. 5, 1936
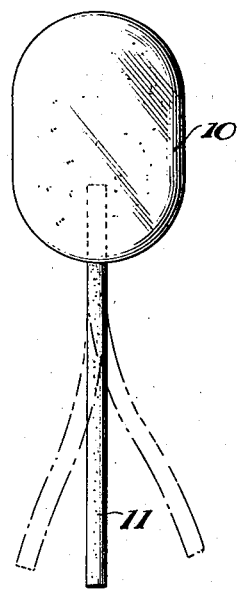
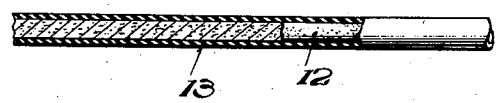
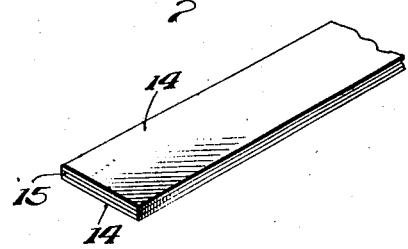
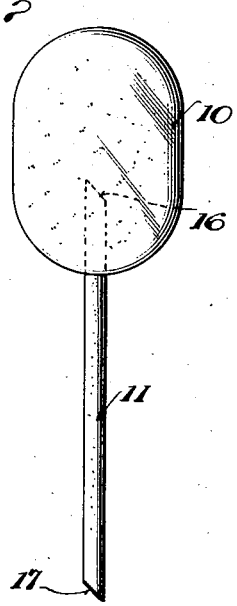
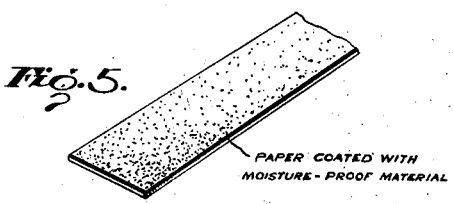
Inventor
Harry E. Davis Patented Oct. 4, 1938

2,131,727

UNITED STATES PATENT OFFICE 2,131,727

CONFECTION HANDLE AND METHOD OF MAKING SAME

Harry E. Davis, Akron, Ohio

Application December 5, 1936, Serial No. 114,467

5 Claims. (Cl. 99—138)

This invention relates to confections, and it refers more particularly to novel handles and methods of producing such handles for confections of the type known as lollipops, "Popsicles" and the like.

Wooden sticks have heretofore been extensively used as handles for confections of the lollipop type, but they have been objectionable for several reasons, chief of which is that they are dangerous to children. More recently some lollipops have been produced commercially with flexible loop handles of paper, but these have been objectionable for several reasons: (1) their rough fibrous surfaces create an unpleasant feeling when in contact with the mouth or lips; (2) they absorb moisture, softening and deteriorating too quickly as the confection is being eaten; (3) being formed of twisted strands, they tend to untwist and open up when they are handled; (4) these loop handles cannot be held so conveniently as rods or sticks.

In its broad aspect, the present invention has among its objects the provision of handles which will be safe, economical, sanitary, of improved appearance and which avoid the aforementioned and other objectionable features of the prior art. More specifically, it contemplates a handle which is flexible, resilient, and capable of use in either straight or looped form. This novel handle is characterized by a body or core of relatively inexpensive flexible material such as paper or pulp, and a coating or outer layer of a relatively smooth, resilient, and substantially moisture-proof material such as rubber, cellulose, wax or the like. The advantageous features of the invention will be fully appreciated from the following description in conjunction with the accompanying drawing wherein several forms of the invention are shown by way of illustration. It is to be expressly understood, however, that the drawing is employed for purposes of illustration only and is not designed as a definition of the limits of the invention, reference being had for this purpose to the appended claims.

Referring to the drawing:

Figure 1 is an elevation of a confection having a handle made in accordance with the present invention;

Figure 2 is an enlarged longitudinal sectional view through one form of the novel handle;

Figure 3 is a view similar to Figure 2 but showing another form of the invention;

Figure 4 is a fragmentary perspective view illustrating one manner of preparing the stock for producing the novel handles;

Figure 5 is a similar view showing another modification, and

Figure 6 is a view similar to Figure 1 but showing a different form of the embedded end of the handle.

Referring now to the drawing in detail, an edible confection 10, of candy or the like and of any desired form, is provided with a novel flexible handle 11. As previously stated, this handle 11 is composed of a relatively inexpensive flexible core coated or treated with a resilient outer surfacing material which is substantially smooth and moisture-proof. One such construction is shown in detail in Figure 2, wherein the core 12 is formed of twisted "kraft" paper or the like and is surrounded by a thin covering 13 of rubber. The covering 13, preferably a dry dispersion of compounded rubber, may be initially formed in a sheet or strip and wrapped about the core and thereafter vulcanized. Another practical method consists in running the twisted paper through a rubber extruding machine (also known as a tubing machine) wherein it becomes covered with the plastic compounded rubber stock which may afterward be cured in open steam, hot water or the like. The product thus produced by a continuous process in elongate form may subsequently be cut into suitable lengths to make the individual handles.

It is desired to point out here that the "kraft" paper or other core referred to above, of itself, would be of insufficient rigidity to support the confection. The rubber coating, if utilized as a tubular support without the core, would likewise lack sufficient rigidity for the above purpose. However, the combination of core and covering intimately associated therewith throughout the length of the former yields a product which not only possesses the required rigidity but also is of sufficient flexibility as to flex upon the application of a slight endwise pressure thereto. The rubber covering intimately associated with the core, as above described, moreover yields a handle having a very desirable elasticity or ability to assume a straight elongate position after flexing. This quality, in addition to preserving the original straight characteristic of the handle and avoiding the possibility of permanent sets or bends in the handle when in use, creates a certain measure of amusement when the lollipop is being used by children.

While excellent results are obtained with rubber and twisted paper as just described, the invention is not limited to the use of these materials. Thus, instead of twisted paper, the core 12 may be formed of a rod of paper pulp or other fibrous material as shown in Figure 3, and, in such instance, the core may be sufficiently rigid to support the confection in substantially upright position. Similarly, the covering 13 may be formed of so-called synthetic rubber, such as that available commercially as "Duprene", rubber chloride, rubber hydrochloride or other equivalents. In any event, the characteristics of the novel handles are such that they are substantially smooth, moisture-proof, odorless, tasteless, flexible, resilient, and of neat appearance. If desired, various pigments or other coloring matters may be compounded with the covering stock to enhance the appearance, and different colors may be used to identify different flavors in the confections. Obviously these features augment the invention's desirability, which resides primarily in the fact that the novel handles are safe.

The covering material need not be applied in a separate operation after the core is formed. It may be applied to either or both surfaces of the paper strip before the latter is twisted. Thus, as shown in Figure 4, separate sheets 14 of rubber or any of the films mentioned may be assembled with the paper strip 15, and the assembly twisted to form the elongate handles compositely. Furthermore, the handles made as described with reference to Figures 4 and 5 may be additionally treated by dipping in a solvent or in additional liquid coating medium.

The novel handles above described may be inserted in the confections by any suitable method. When so inserted, they will remain firmly anchored without any tendency to loosen, unravel, or untwist. As a matter of fact, the covering material not only protects the core from moisture, but it also serves as a binder to hold the core together, thus maintaining the flexibility and resiliency. If desired, the anchorage may be further improved by having the inner end of the handle cut at an angle as indicated at 16 in Figure 6. This arrangement positively prevents the confection from turning about the axis of the handle even if the surface bond between them should become loosened. Furthermore, this beveled or angularly cut end gives a greater degree of flexibility to the inner end of the handle, thereby adding to its safety feature.

It will be noted also from this figure that the lower end of the handle is also angularly cut, as at 17 thus rendering said end more flexible than the body of the handle. As shown, the angle of the cut end 17 is acute with respect to the axis of the handle. A distinct safety advantage is derived from this construction inasmuch as a relatively slight endwise thrust applied to such end will cause the handle to more readily flex or bend.

From the foregoing, it will be evident that an improved confection handle has been provided, one which will be safe, durable, economical and of neat appearance. It will be understood that the invention is not limited to the forms shown but is susceptible of further modifications in the details of construction and in the steps of the method of producing the same. Reference will, therefore, be had to the appended claims for a definition of the limits of the invention.

What is claimed is:

1. In combination with a confection, a rod-like handle therefor comprising a flexible fibrous core and a smooth, continuous covering of a dry dispersion of compounded rubber intimately associated therewith and imparting flexibility thereto, said core being centered throughout its entire length in said covering, the said handle being rigid enough to hold up the confection for eating yet flexible enough to yield or bend when subjected to a slight endwise pressure.

2. In combination with a confection, a rod-like handle therefor comprising a flexible core formed of tightly twisted paper and a smooth thin-walled, continuous covering of a dry dispersion of compounded rubber intimately associated therewith and imparting flexibility thereto, said core being centered throughout its entire length in said covering, the said handle being rigid enough to hold up the confection for eating yet flexible enough to yield or bend when subjected to a slight endwise pressure.

3. A confection having a normally straight handle comprising a flexible and resilient rod-like handle of sufficient rigidity to support the confection in substantially upright position, said handle being characterized by an outer end cut at an acute angle with respect to the axis of the handle, said end having greater flexibility than the body of the handle, and an inner end also cut at an acute angle with respect to the handle axis, the latter end being embedded in the confection and being no greater in width than the body of the handle and preventing relative rotation between the handle and the confection.

4. In combination with a confection, a normally straight safety handle therefor comprising an elongated flexible core of relatively small diameter, said core being formed of tightly twisted paper, and a protective, continuous and smooth covering surrounding said core and being in intimate engagement therewith throughout its length, said covering consisting of a dry dispersion of a rubber compound, imparting flexibility and elasticity to the core and preventing untwisting of the latter as well as supporting the same in such manner that the handle produced by the paper core and covering is sufficiently rigid to support the confection in an upright position while possessing sufficient flexibility to yield or bend upon the application of a relatively slight endwise pressure thereto.

5. In combination with a confection, a normally straight safety handle therefor comprising a flexible core of tightly twisted paper of insufficient rigidity to support the confection in an upright position, said core having a smooth and continuous flexible covering of a dry dispersion of a rubber compound surrounding the same and in intimate engagement therewith throughout its length, said covering preventing untwisting of the core and supporting the latter in such manner as to impart sufficient rigidity thereto to support the confection in an upright position, said handle being sufficiently flexible as to yield or bend upon the application of a relatively slight endwise pressure thereto.

HARRY E. DAVIS.